Patented June 13, 1933

1,914,176

UNITED STATES PATENT OFFICE

GORDON R. STEUART, DECEASED, LATE OF DENVER, COLORADO, BY KATHERINE STEUART, ADMINISTRATRIX, OF DENVER, COLORADO, ASSIGNOR, BY MESNE ASSIGNMENTS, TO KALUNITE COMPANY, A CORPORATION OF DELAWARE

METHOD OF MANUFACTURING ANHYDROUS WATER SOLUBLE ALUMINUM SULPHATE

No Drawing. Application filed April 23, 1932. Serial No. 607,219.

This invention relates to the manufacture of anhydrous water soluble aluminum sulphate and has for its object to provide an efficient and relatively economical method for producing this material.

In a broad sense, this process may be considered as one utilizing a precipitated, finely divided basic ammonium alum as a starting material, although, for practical purposes, the process is to be considered as one for the production of the anhydrous water soluble aluminum sulphate from a starting material consisting of an ore of alumina.

Generally speaking, this invention consists in mixing with a finely divided precipitate of basic ammonium alum, ammonium sulphate in such quantity that its sulphur trioxide component, together with the sulphur trioxide component of the ammonium sulphate constituent of the basic alum, will be present in sufficient quantity to react with the uncombined alumina of the basic aluminum sulphate constituent of the alum to form, after the elimination of the ammonia constituent of the mixture, aluminum sulphate. The mixture of basic alum and ammonium sulphate is then heated through temperatures of from 350° to 600° C., as a result of which the ammonium sulphate constituent of the mixture is, for the most part, decomposed, the ammonia passing off and the sulphur trioxide component reacting with the uncombined alumina of the basic aluminum sulphate to form an anhydrous water soluble aluminum sulphate. A certain percentage of the ammonium sulphate will in this process be vaporized and driven off as ammonium sulphate. This percentage of ammonium sulphate will, in a proper furnacing operation, not materially exceed 15% of the total ammonium sulphate present in the mixture and the ammonium sulphate added in compounding the mixture, must take this vaporization of undecomposed ammonium sulphate into consideration. The ammonia and ammonium sulphate eliminated in the furnacing operation are easily salvaged by bringing them into solution and with only comparatively small loss of unrecovered ammonia.

It is advisable that the ammonium sulphate mixed with the basic alum should be dry as any water added with the ammonium sulphate will have to be eliminated in the furnacing operation to insure an effective decomposition of the ammonium sulphate and the reaction of its sulphur trioxide constituent with the uncombined alumina of the basic aluminum sulphate.

Starting with an ore of aluminum, my process involves the treatment of the ore, (suitable ores are bauxite, kaolin and the like) with sulphuric acid to convert its alumina into aluminum sulphate and to separate the aluminum sulphate as a solution. In many cases this will require a preliminary calcination of the ore to dehydrate it and render its alumina constituent completely soluble in acid. To the aluminum sulphate solution is added a solution of ammonium sulphate in sufficient quantity to bring the solution to the composition of a normal ammonium alum solution and, while the ammonium sulphate can be added to the solution of aluminum sulphate after it is separated from the gangue, it is most conveniently added in admixture with the acid with which the ore is treated. After the separation of the ammonium alum solution from the gangue it can be treated for the elimination of soluble impurities, such as ferric iron, in any convenient way, the treatment as a rule involving the crystallization of ammonium alum, in which case the values remaining in the mother liquor can be recovered by using this mother liquor in admixture with the solution used in leaching the ore. Where the alum has been crystallized from the solution, it is again brought into solution, preferably to form a solution of about 80% alum and this solution is then heated under pressure to temperatures between 140° and 200° C., to bring about a reaction which results in the formation and precipitation of a finely divided basic ammonium alum and a mother liquor containing 55% of the sulphur trioxide constituent of the aluminum sulphate component of the normal alum acted upon in the reaction and 67% of the ammonium sulphate constituent of the normal alum so reacted upon, together with any undecomposed normal ammonium alum.

When heated to approximately 200° C., about 80% of the normal alum is decomposed, leaving 20% in the mother liquor but the yield of basic alum can be increased by adding to the normal alum solution a solution of ammonium sulphate, preferably equal in quantity to the ammonium sulphate constituent of the alum. Treating a solution of this kind, 95% or even a higher percentage of the normal alum, will be decomposed, thus increasing the quantity of basic alum, while the added ammonium sulphate remains unaltered in the mother liquor. It will be seen that, by the described treatment, the basic alum precipitated will or can contain almost all of the alumina of the normal alum solution combined with only about 45% of the sulphuric acid combined with the alumina in the normal alum and only about 33% of the ammonium sulphate constituent of the normal alum.

The basic alum, after separation from its mother liquor, is then mixed with ammonium sulphate, preferably in dry or crystallized form and in sufficient quantity to provide in connection with the ammonium sulphate constituent of the basic alum, when the ammonia component of the ammonium sulphate is eliminated and such ammonium sulphate is volatilized as is unavoidable, to cause in the roasting of the mixture sufficient of the sulphur trioxide radical of the sulphate to combine with the uncombined alumina of the basic aluminum sulphate constituent of the basic alum.

Where a substantially neutral aluminum sulphate is desired, it has been found good practice to admix with the basic alum 65% by weight of ammonium sulphate and if a slightly acid or slightly basic sulphate is desired, this percentage should be increased or diminished.

The next step in this process consists in heating the mixture of basic alum and ammonium sulphate, preferably in a muffle furnace, through a range of temperatures from 350° to 600° C., as a result of which the ammonium sulphate is, for the most part, decomposed, the ammonia passing off as a vapor and the sulphur trioxide, uniting with the previously uncombined alumina of the basic alum to form a substantially anhydrous water soluble aluminum sulphate. A certain portion of the ammonium sulphate will, in this treatment, be volatilized but this portion, together with the ammonia, can readily be recovered by well known methods and, finally, after absorption in water and conversion of the ammonia into ammonium sulphate, the ammonium sulphate can be recovered from the solution in a dry or crystallized form and reused in the treatment of further bodies of basic alum or, partly in this way, or partly by the admixture of a portion of the solution with the mother liquor from which the basic alum is precipitated, can be used in the treatment of further bodies of ore, thus salvaging, with the exception of such losses as are unavoidable, the sulphuric acid and ammonium sulphate values eliminated from the normal and basic alums by the described treatment and it will be seen that by the cyclical use of the sulphuric acid eliminated from the normal alum and the ammonium sulphate, also eliminated from the normal alum, and the ammonia and ammonium sulphate eliminated in the heat treatment of the mixture of basic alum and ammonium sulphate, it will only be necessary to supply such additional sulphuric acid as in the treatment of ores is necessary to extract its aluminum values and such additional ammonium sulphate as is necessary to make up for losses unavoidable in the process.

As an example of the carrying out of this process, it is started with a soft Georgia kaolin of the composition:

| | Percent |
|---|---|
| Alumina | 38.01 |
| Water | 14.27 |
| Silica | 44.65 |
| Potash | 0.17 |
| Calcium oxide | 0.04 |
| Magnesia | 0.13 |
| Ferric oxide | 1.20 |
| Titania | 1.44 |
| Phosphorus pentoxide | 0.09 |

The kaolin is disintegrated and roasted for one hour at 600° C. in a rotary kiln, thereby eliminating the water content, increasing the rate of solution of the alumina in the acid, and decreasing the iron oxide solubility to 25% of the total present in the ore.

After cooling to 200° C., the calcine is treated with an acid solution containing 14% sulphuric acid and 6.3% ammonium sulphate in pachuca tanks arranged for countercurrent flow. The reaction is complete in one hour. 90% of the alumina present in the calcine is dissolved as aluminum sulphate. Sufficient ore is used to neutralize the sulphuric acid of the leaching solution. The silica will be unattacked, and negligible traces only of potash and titania dissolved. About 50% of the calcium oxide, magnesia, and phosphorus pentoxide will be found in the neutral alum solution, which will be an approximately 55% ammonium alum solution.

A solution of barium sulphide is fed into the last pachuca tank to reduce the dissolved ferric sulphate to ferrous sulphate, in which case the alum crystallized will be iron-free.

The major portion of the insoluble residue is separated by settling in cones, which also function as washers. The finely divided insoluble residue which is not settled in the cones is removed from the liquor by filtration through filter presses, yielding a clear alum solution.

The clear ammonium alum solution, discharged at a temperature of 80° C. from the filter presses, is cooled and crystallized in spray coolers. The crystals and mother liquor are separated by settling and filtration on a vacuum type filter, where the crystals are washed. About one-third of the mother liquor is cooled from room temperature to 0° C. by refrigeration, the alum crystals removed and the refrigerated liquor discarded. The remaining mother liquor is returned to the system and used to make up fresh batches of leach solution.

The alum crystals are dissolved by condensing steam to make an 80% solution, which is heated to 200° C. in an autoclave. 80% of the alumina will be precipitated as basic ammonium alum with the simultaneous formation of a sulphuric acid-ammonium sulphate solution. After cooling, the precipitate is separated from the liquor by settling and filtration on a vacuum filter, on which the precipitate is washed. The mother liquor is returned to the leach system to make up the fresh solvent required. The precipitate discharged from the filter contains moisture up to 30% of the dry weight.

The moist basic ammonium alum is dried to remove the free moisture content and is then thoroughly mixed in a tube mixer with 0.7 of a pound for each pound of dry basic ammonium alum by weight.

The mixture is fed into a multiple muffle hearth furnace with the top hearth at 350° C., the following hearths at intermediate temperatures, the last five at 600° C.

The ammonia and ammonium sulphate gases are cooled; the ammonium sulphate is collected in a bag house, the ammonia gas being absorbed in a portion of the mother liquor from the basic alum precipitation.

The anhydrous aluminum sulphate discharged from the furnace is cooled. It will contain a slight percentage of insoluble matter well within the limits of commercial specifications and will contain a slight percentage of soluble basic alumina.

Having now described the invention, what is claimed as new and desired to secure by Letters Patent, is:

1. The method of manufacturing substantially anhydrous water soluble aluminum sulphate which consists in mixing with a finely divided precipitate of basic ammonium alum, ammonium sulphate in such quantity that its sulphuric acid component, together with that of the ammonium sulphate constituent of the basic alum, will, after the elimination of the ammonia constituent of the mixture as ammonia and ammonium sulphate in the furnacing treatment, be present in sufficient quantity to combine with the uncombined alumina constituent of the basic alum to form aluminum sulphate, then heating the mixture to temperatures between 350° and 600° C. to effect the decomposition of the ammonium sulphate constituent of the mixture to such an extent as will leave in the mixture sulphur trioxide in sufficient quantity to react with the uncombined alumina to form aluminum sulphate, together with the elimination from the mixture of any undecomposed ammonium sulphate.

2. The method of manufacturing a substantially anhydrous water soluble aluminum sulphate which consists in treating an ore of alumina with sulphuric acid to convert its alumina content into aluminum sulphate, separating the aluminum sulphate from the gangue as a solution of aluminum sulphate and mixing with the aluminum sulphate solution a solution of ammonium sulphate in sufficient quantity to form a solution of a normal ammonium alum, subjecting the ammonium alum solution after purification (if desired) to heating under pressure to temperatures of from 140° to 200° C., to bring about the formation and precipitation of a basic ammonium alum and the formation of a mother liquor containing 55% of the sulphuric acid component of the normal alum involved in the reaction and 67% of the ammonium sulphate component of the normal alum so reacted upon; then, after separation of the basic alum from the mother liquor, mixing therewith ammonium sulphate in such quantity that its sulphur trioxide component, together with that of the ammonium sulphate component of the basic alum, will, after furnacing, be present in sufficient quantity to react with the uncombined aluminum sulphate component of the basic alum to form water soluble aluminum sulphate, then heating the mixture of basic alum and ammonium sulphate to temperatures between 350° and 600° C. to effect the decomposition in part of the ammonium sulphate constituent of the mixture with elimination by vaporization of any undecomposed ammonium sulphate and the reaction of the sulphur trioxide component of the ammonium sulphate constituents with the uncombined alumina of the basic alum to form aluminum sulphate, salvaging the ammonia and ammonium sulphate eliminated in the heating operation as ammonium sulphate and utilizing the mother liquor from which the basic ammonium alum is precipitated, in the treatment of further bodies of ore and the formation of a normal ammonium alum solution to be further treated as described for the production of the anhydrous water soluble aluminum sulphate, and utilizing the salvaged ammonium sulphate from the furnacing operation either in the preparation of the normal alum or for admixture with basic alum in the treatment of further bodies of ore.

KATHERINE STEUART,
*Administratrix of the Estate of Gordon R. Steuart, Deceased.*